United States Patent Office 2,914,545
Patented Nov. 24, 1959

2,914,545

PREPARATION OF $\Delta^{4,9(11)}$-PREGNADIENE-17α,21-DIOL-3,20-DIONE-21-ACETATE Josef E. Herz, New Brunswick, and Josef Fried, Princeton, N.J., assignors to Olin Mathieson Chemical Corporation, New York, N.Y., a corporation of Virginia No Drawing. Original application June 4, 1954, Serial No. 434,671, now Patent No. 2,842,568, dated July 8, 1958. Divided and this application April 18, 1958, Serial No. 729,251

6 Claims. (Cl. 260—397.45)

This application is a division of our application Serial No. 434,671, filed June 4, 1954, now U.S. Patent No. 2,842,568, granted July 8, 1958.

This invention relates to the synthesis of valuable steroids and has for its object the provision of an advantageous process of preparing $\Delta^{4,9(11)}$-pregnadiene-17α,21-diol-3,20-dione-21-acetate from hydrocortisone 21-acetate. In accordance with the process of this invention, this conversion is effected by treating hydrocortisone 21-acetate with a dehydrating agent. Suitable reagents for this dehydration step include, inter alia, metal bromides, such as the alkali metal bromides (e.g., lithium bromide), and certain acyl halides, particularly the sulfonyl halides (e.g., methanesulfonyl chloride). The reaction is carried out in a suitable solvent which depends on the dehydrating agent used. For dehydrating agents such as metal bromides, the lower alkanoic acids are particularly efficient solvents, glacial acetic acid being especially preferred. For dehydrating agents such as acyl chlorides (e.g., sulfonyl chlorides and carboxylic acid chlorides), organic nitrogen-containing bases serve as suitable solvents, pyridine being particularly preferred.

The process of this invention is illustrated by the following examples:

EXAMPLE 1

*Dehydration of hydrocortisone acetate with lithium bromide*

A solution of 100 mg. of hydrocortisone acetate and 212 mg. of dry lithium bromide in 3 ml. of glacial acetic acid is refluxed with the exclusion of moisture for 45 minutes. The moderately brown solution is evaporated to dryness in vacuo, the residue dissolved in chloroform and washed repeatedly with water and bicarbonate. After drying and evaporation of the solvent in vacuo, about 108 mg. crystalline material is obtained, which after two recrystallizations from ethyl acetate yields about 43 mg. of $\Delta^{4,9(11)}$-pregnadiene-17α,21-diol-3,20-dione-21-acetate; M.P. 227–231°.

The same yield (about 43 mg., M.P. 232–235°) is obtained when the reaction is run for 30 minutes. The yield is lower when less lithium bromide is used, or the reaction time is further shortened.

EXAMPLE 2

*Dehydration of hydrocortisone acetate with methanesulfonyl chloride*

To a solution of 100 mg. of hydrocortisone acetate in 5 ml. of dry pyridine is added 0.2 ml. of methanesulfonyl chloride. The mixture is allowed to stand in the icebox for 112 hours. The excess mesylchloride is then destroyed by addition of ice, the mixture taken up in chloroform, washed with water, 1 N HCl, bicarbonate and water, dried over sodium sulfate and evaporated to dryness in vacuo. The residue weighs about 118 mg. Repeated crystallization from ethanol yields about 18 mg. of $\Delta^{4,9(11)}$-pregnadiene-17α,21-diol-3,20-dione-21-acetate; M.P. 231–234°; $[\alpha]_D$ +105° (c., 0.5 in chloroform).

The invention may be otherwise variously embodied within the scope of the appended claims.

What is claimed is:

1. The process for converting hydrocortisone acetate to $\Delta^{4,9(11)}$-pregnadiene-17α,21-diol-3,20-dione-21-acetate, which comprises reacting said hydrocortisone acetate with a dehydrating agent selected from the group consisting of alkali metal bromides and a lower alkane sulfonyl halide.

2. The process which comprises reacting $\Delta^4$-pregnene-11β,17α,21-triol-3,20-dione-21-acetate with methane sulfonyl chloride in the presence of pyridine to produce $\Delta^{4,9(11)}$-pregnadiene-17α,21-diol-3,20-dione-21-acetate.

3. The process for converting hydrocortisone acetate to $\Delta^{4,9(11)}$-pregnadiene-17α,21-diol-3,20-dione-21-acetate, which comprises reacting said hydrocortisone acetate with an alkali metal bromide.

4. The process of claim 3 wherein the alkali metal bromide is lithium bromide.

5. The process for converting hydrocortisone acetate to $\Delta^{4,9(11)}$-pregnadiene-17α,21-diol-3,20-dione-21-acetate, which comprises reacting said hydrocortisone acetate with an alkali metal bromide in the presence of a lower alkanoic acid.

6. The process for converting hydrocortisone acetate to $\Delta^{4,9(11)}$-pregnadiene-17α,21-diol-3,20-dione-21-acetate, which comprises reacting said hydrocortisone acetate with lithium bromide in the presence of glacial acetic acid.

No references cited.